US010013487B2

(12) United States Patent
Hsi et al.

(10) Patent No.: US 10,013,487 B2
(45) Date of Patent: Jul. 3, 2018

(54) SYSTEM AND METHOD FOR MULTI-MODAL FUSION BASED FAULT-TOLERANT VIDEO CONTENT RECOGNITION

(71) Applicant: VISCOVERY PTE. LTD., Singapore (SG)

(72) Inventors: Kuo-Don Hsi, Singapore (SG); Chun-Chieh Huang, Singapore (SG); Yen-Cheng Chen, Singapore (SG)

(73) Assignee: VISCOVERY PTE. LTD., Singapore (SG)

( * ) Notice: Subject to any disclaimer, the term of this patent is extended or adjusted under 35 U.S.C. 154(b) by 122 days.

(21) Appl. No.: 15/007,872

(22) Filed: Jan. 27, 2016

(65) Prior Publication Data

US 2017/0124096 A1 May 4, 2017

(30) Foreign Application Priority Data

Nov. 4, 2015 (TW) .............................. 104136366 A

(51) Int. Cl.
*G06K 9/00* (2006.01)
*G06F 17/30* (2006.01)
*G06K 9/62* (2006.01)

(52) U.S. Cl.
CPC ...... *G06F 17/3079* (2013.01); *G06F 17/3082* (2013.01); *G06F 17/30787* (2013.01);
(Continued)

(58) Field of Classification Search
None
See application file for complete search history.

(56) References Cited

U.S. PATENT DOCUMENTS 6,850,695 B1 * 2/2005 Sampsell .......... G06F 17/30265
376/117
8,121,198 B2 * 2/2012 Thambiratnam . G06F 17/30781
375/240.26
(Continued)

OTHER PUBLICATIONS

Kojima et al., "Natural language description of human activities from video images based on concept hierarchy of actions", International Journal of Computer Vision 50(2), 171-184, 2002.*

*Primary Examiner* — Soo Park
(74) *Attorney, Agent, or Firm* — Chun-Ming Shih; HDLS IPR Services

(57) ABSTRACT

A system and a method for multi-modal fusion based fault tolerant video content recognition is disclosed. The method conducts multi-modal recognition on an input video to extract multiple components and their respective appearance time in the video. Next, the multiple components are categorized and recognized respectively via different algorithms. Next, when the recognition confidence of any component is insufficient, a cross-validation with other components is performed to increase the recognition confidence and improve the fault tolerance of the components. Furthermore, when the recognition confidence of an individual component is insufficient, the recognition continues and tracks the component, spatially and temporally when it applies, until frames of high recognition confidence in the continuous time period is reached. Finally, multi-modal fusion is performed to summarize and resolve any recognition discrepancies between the multiple components, and to generate indices for every time frame for the ease of future text-based queries.

12 Claims, 6 Drawing Sheets

(52) U.S. Cl.
CPC ... *G06F 17/30828* (2013.01); *G06K 9/00751* (2013.01); *G06K 9/6265* (2013.01)

(56) References Cited

U.S. PATENT DOCUMENTS

| | | | | |
|---|---|---|---|---|
| 9,583,149 | B2* | 2/2017 | Stieglitz | H04N 21/47217 |
| 2010/0131571 | A1* | 5/2010 | Reuveni | G06F 17/30038 707/803 |
| 2011/0249867 | A1* | 10/2011 | Haas | G06K 9/00818 382/103 |
| 2013/0259390 | A1* | 10/2013 | Dunlop | G06K 9/00718 382/224 |
| 2014/0355907 | A1* | 12/2014 | Pesavento | G06F 17/30038 382/305 |
| 2016/0103830 | A1* | 4/2016 | Cheong | G06F 3/0488 715/738 |
| 2016/0275642 | A1* | 9/2016 | Abeykoon | G06T 1/20 |
| 2017/0127016 | A1* | 5/2017 | Yu | G06K 9/00711 |
| 2017/0132319 | A1* | 5/2017 | Simske | G06F 17/30719 |

* cited by examiner

SYSTEM AND METHOD FOR MULTI-MODAL FUSION BASED FAULT-TOLERANT VIDEO CONTENT RECOGNITION

BACKGROUND OF THE INVENTION

Field of the Invention

The present invention relates to a recognition system and recognition method, in particular relates to a video content recognition system and video content recognition method.

Description of Prior Art

As network technology advances and cloud service becomes popular, increasingly many content providers upload videos to the Internet, giving users access to multimedia contents that are much richer than pure text. When content providers upload videos, such as music videos, commercials, movies, textual descriptions are manually associated with each video through a process known as "tagging." When users conduct queries for a video, they input keywords on an Internet platform and videos with matching tags are returned to the users.

As mentioned above, when a content provider upload a video, they need to manually tag the video with keywords, which is a time consuming and costly process. Furthermore, the aforementioned tags are usually based on the main story or the ideas the director want to convey, not necessarily the actual interaction between the characters, objects, scenes, music, etc., in the video. Therefore, when users query with keywords associated with the characters, objects, scenes and music of a specific video, the video they're looking for might not be in the search result.

As a result, systems and methods for the efficient generation of video tags have been a hotly investigated topic, in particular, those that are capable of automatically indexing the detailed information of the individual objects.

SUMMARY OF THE INVENTION

The objective of the present invention is to provide a system and method for multi-modal fusion based fault-tolerant video content recognition, which recognizes the individual components and their appearance time in a video. These information are used to automatically generate video tags that are in turn used for keyword based queries of videos.

The other objective of the present invention is to provide a system and method for multi-modal fusion based fault-tolerant video content recognition, which fuses the recognition results from recognition algorithms of different modalities to improve the recognition confidence and the fault tolerance of each component.

In order to achieve the aforementioned objectives, the recognition method of the present invention conducts multi-modal recognition on an input video to extract multiple components and their respective appearance time in the video. Next, the multiple components are categorized and recognized respectively via different algorithms. Next, when the recognition confidence of any component is insufficient, a cross-validation with other components is performed to increase the recognition confidence and improve the fault tolerance of the components. Furthermore, when the recognition confidence of an individual component is insufficient, the recognition continues and tracks the component, spatially and temporally when it applies, until frames of high recognition confidence in the continuous time period is reached. Finally, multi-modal fusion is performed to summarize and resolve any recognition discrepancies between the multiple components, and to generate indices for every time frame for the ease of future text-based queries.

Compared with prior art, the advantage achieved by the method and system of the present invention is that the recognition system generates an index that includes all components and their appearance time in the video. Thus, when a user conducts a text query for videos, the query can be performed directly on the different components, such as people, scenes, music, motion, etc. The search result directly includes the videos matching with the components, as well as the video segments including the components, which is convenient to users.

In addition, the method and system of the present invention categorize and recognize the components respectively via different algorithms. Furthermore, it performs cross-validation with multiple components appearing in same frame, or tracks an individual component of low recognition confidence spatially and temporally until frames of high recognition confidence is reached, so as to increase the recognition confidence and improve the fault tolerance of each component.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
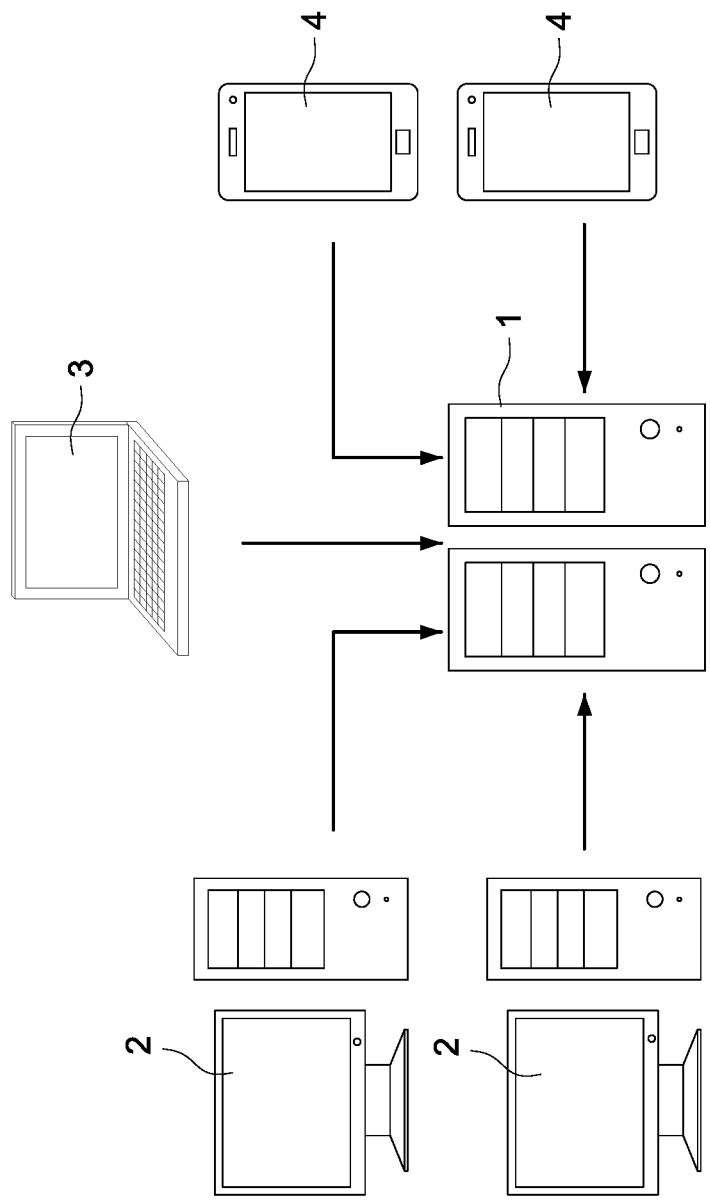
FIG. 1 is an architecture diagram of the video recognition platform of the first embodiment according to the present invention.

FIG. 1 is an architecture diagram of the video recognition platform of the first embodiment according to the present invention. According to the present invention, a system for multi-modal fusion based fault-tolerant video content recognition system 1 is disclosed (referred as the system 1 in the following), and the system 1 adopts a multi-modal fusion based fault-tolerant video content recognition method (referred as the method in the following).

As shown in FIG. 1, the system 1 is implemented as a cloud platform. Users connect to the cloud platform and upload videos via client ends, such as desktop computers 2, laptops 3 or mobile devices 4, and the system 1 analyzes the uploaded videos. After the analysis is completed, the users can conduct queries for the videos with text, pattern or movie associating with the videos. The system and method facilitate the videos to spread on the Internet, and increase the visibility of the videos.

Furthermore, the system 1 extracts and recognizes the components appearing in the video, and automatically generates video tags with meaningful video description based on the recognized components. The plurality of components comprises multiple types such as face, trademark, text, music, voice, motion, object, scene, etc., but is not limited thereto. As a result, the content provider does not have to manually tag the video—this time consuming and costly process is no longer necessary.

Figure 2:
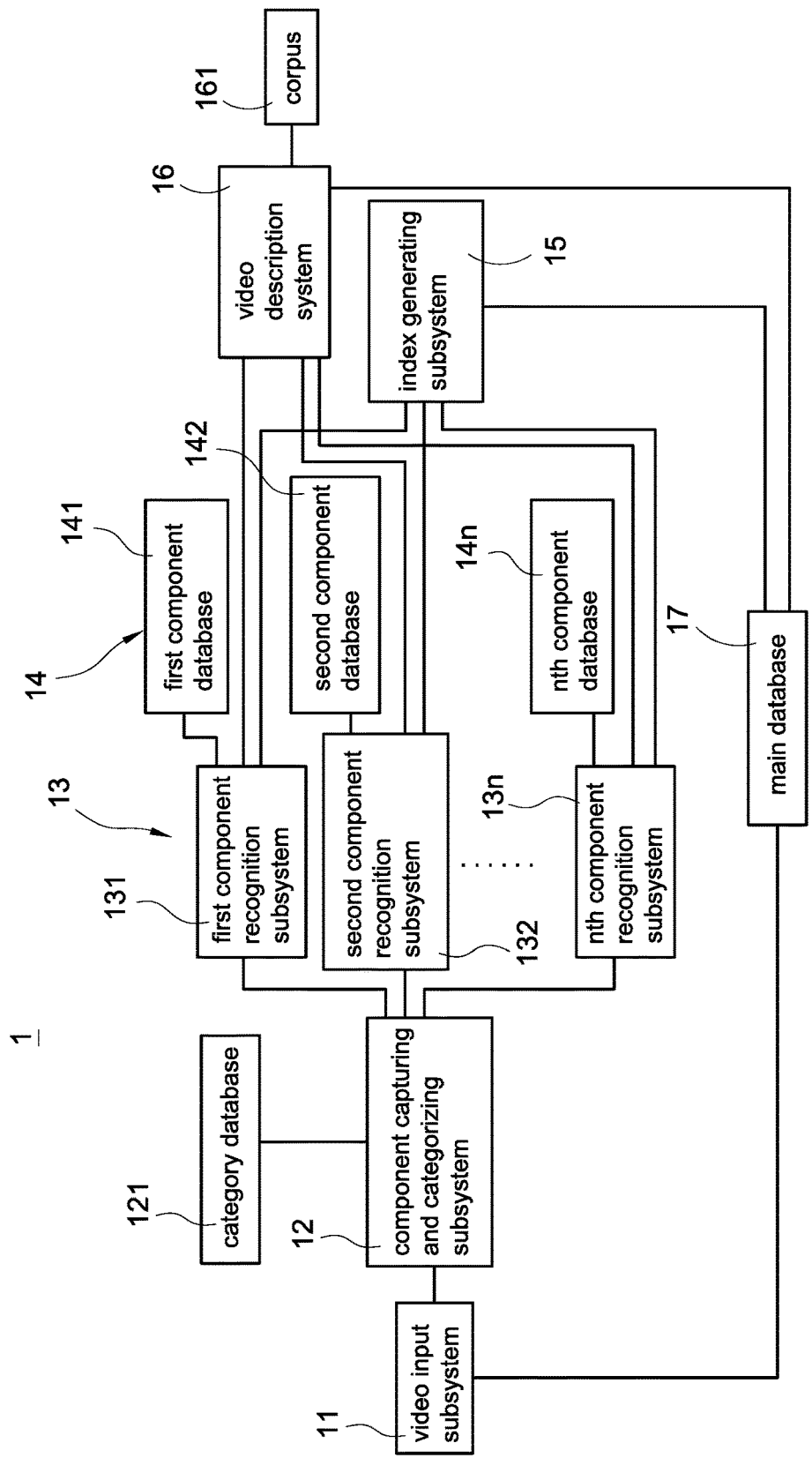
FIG. 2 is a recognition system block diagram of the first embodiment according to the present invention.

FIG. 2 is a recognition system block diagram of the first embodiment according to the present invention. As shown in FIG. 2, the system 1 comprises a video input subsystem 11, a component capturing and categorizing subsystem 12 connecting to the video input subsystem 11, a plurality of component recognition subsystems 13 connecting to the component capturing and categorizing subsystem 12, and an index generating subsystem 15 connecting to the plurality of component recognition subsystems 13.

The video input subsystem 11 is used for receiving an input video. In the embodiment, the video input subsystem 11 receives the video uploaded by users via a network. In other embodiments, the video input subsystem 11 receives the video from peripheral electronic devices, hard drives or database via wired means or wireless means (such as Bluetooth, RF, Zigbee, etc.), and the scope is not limited thereto.

The component capturing and categorizing subsystem 12 receives the video from the video input subsystem 11, and performs a first stage analysis on the video. Specifically, in the first stage analysis, the component capturing and categorizing subsystem 12 extracts all components and their appearance time that appeared in the video.

After the components and their appearance time are extracted, the component capturing and categorizing subsystem 12 categorizes each component into different categories. In the embodiment, the component capturing and categorizing subsystem 12 categorizes the components via an algorithm and the categories comprises face, image, text, audio, motion, object, scene, etc., but the scope is not limited thereto.

Specifically, the system 1 comprises a category database 121 connecting to the component capturing and categorizing subsystem 12. Multiple characteristics according to each of the plurality of categories are stored in the category database 121. More specifically, all of the components have specific characteristic(s). In the embodiment, the component capturing and categorizing subsystem 12 compares the individual components with the characteristics of the category database 121, so as to respectively determine each component's category and then categorize each component into the corresponding category.

In the embodiment, the plurality of component recognition subsystems 13 is used to perform a second stage analysis, wherein the quantity of the plurality of component recognition subsystems 13 is corresponding to the quantity of the categories supported by the component capturing and categorizing subsystem 12. After performing the second stage analysis, the system 1 generates labels for the individual components.

In the embodiment shown in FIG. 2, the component capturing and categorizing subsystem 12 classifies the components into n categories. Accordingly, the plurality of component recognition subsystems 13 in FIG. 2 comprises a first component recognition subsystem 131, a second component recognition subsystem 132, . . . , to a nth component recognition subsystem 13n. The first component recognition subsystem 131 recognizes one or multiple components in a first category, the second component recognition subsystem 132 recognizes one or multiple components in a second category, . . . , and the nth component recognition subsystem 13n recognizes one or multiple components in an nth category, and so on.

It should be noted that in a preferred embodiment, the components of the video are classified into seven categories, such as face, image, text, audio, motion, object and scene as aforementioned. In this case, the quantity of the plurality of component recognition subsystems 13 is seven and is according to the seven categories, but not limited thereto.

As mentioned above, the plurality of component recognition subsystems 13 is respectively according to different categories, and applies different matching algorithms to recognize the individual components in each category. For example, the first component recognition subsystem 131 applies a facial recognition algorithm and recognizes components in a "face" category via the facial recognition algorithm in order to respectively label the individual components with corresponding characters. In another example, the second component recognition subsystem 132 applies an object recognition algorithm and recognizes components in an "object" category via the object recognition algorithm in order to respectively label the individual components with corresponding object, such as cars, planes, bags, watches, etc.

The system 1 also comprises a plurality of component databases 14. The quantity of plurality of component databases 14 is corresponding to the quantity of the plurality of component recognition subsystems 13 (such as a first component database 141, a second component database 142 to a nth component database 14n shown in FIG. 2). Each component database 14 is respectively connected with one of the plurality of component recognition subsystems 13, and each component database 14 belongs to the same category as the connected component recognition subsystem 13.

More specifically, each component database 14 stores specific component data corresponding to the category which the component database 14 belongs to. When performing the second stage analysis, each component recognition subsystem 13 respectively compares the components with the component data of the same category, so as to label the individual components.

It should be noted that the plurality of component recognition subsystems 13 also perform a cross-validation (or referred as multi-modal recognition) with multiple components in different categories in order to increase the recognition confidence and improve the fault tolerance of the components. Specifically, when the recognition confidence of a specific component is insufficient (such as under 70% or 80%), the plurality of component recognition subsystems 13 performs cross-validation on the specific component with other components appearing at the same time (which appeared in same time frame), so as to increase the recognition confidence and improve the fault tolerance of the specific component.

For example, the first component recognition subsystem 131 recognizes a first component (such as a face), and labels the first component as "Jay Chou", but the recognition confidence of the first component is only 70%. Accordingly, the system 1 may not apply the recognition result because the recognition confidence of the first component is insufficient. However, if the second component recognition subsystem 132 at the same time recognizes a second component (such as an audio) and labels the second component as "Satinwoods" which has 99% recognition confidence, and the nth component recognition subsystem 13n recognizes a third component (such as an object) and labels the third component as "piano" which has 95% recognition confidence, therefore, the plurality of component recognition subsystems 13 performs the cross-validation on the first component, the second component and the third component. As such, because Jay Chou is good at piano and Satinwoods is a song of Jay Chou which is well-known, the recognition confidence of the first component labeled as "Jay Chou" may then be increased (for example, increased to 85%) after performing the cross-validation. When the recognition confidence of the first component exceeds a standard value, the system 1 then applies the recognition result of the first component.

In the aforementioned embodiments, the system 1 performs the cross-validation only when the recognition confidence of any component is insufficient. Yet in other embodiment, the system 1 regularly performs the aforementioned cross-validation in order to assure the recognition result of every component of the video.

For example, the nth component recognition subsystem 13n recognizes a fourth component (such as an object), and labels the fourth component as "car" which has 99% recognition confidence, but it cannot label the fourth component as a certain brand or type of the car. At the time, if the second component recognition subsystem 132 recognize a fifth component (such as an audio) in the same frame and labels the fifth component as "BMW" which has 99% recognition confidence, the plurality of component recognition subsystems 13 can perform the cross-validation and then label the fourth component as "BMW" of the car, and the recognition confidence of the fourth component may be improved to 99%.

As mentioned above, the method and system according to the present invention apply multiple algorithms to respectively recognize the individual components of different categories in order to generate more applicable component recognition results. In addition, the present invention also performs the cross-validation with multiple components of different categories by fusing the recognition results from multiple algorithms when it is required. As a result, as long as the multiple components appeared at the same time are related to each other, the recognition confidence of the multiple components is effectively increased. However, the aforementioned embodiment is only an example of the present invention and the scope is not limited thereto.

It should be noted that the aforementioned cross-validation is also applied to any individual component. In details, a component may appear continuously or consecutively in different time period in the same video. When the recognition confidence of any component is recognized insufficient by any component recognition subsystem 13, the component recognition subsystem 13 can then perform the cross-validation with the same component appeared in different time periods in the same video, by continuing and tracking the component spatially and temporally when it applies in the same video, until frames of high recognition confidence in the continuous time period are reached. Therefore, the component recognition subsystem 13 can label the component appeared in all of the time periods as long as the recognition confidence of the component is increased and is sufficient. As such, the recognition confidence of the components is increased and the fault tolerance of the components is improved easily by the system 1.

The index generating subsystem 15 receives the recognition results of the components via the plurality of component recognition subsystems 13, and a multi-modal fusion is performed to summarize and resolve any recognition discrepancies between the multiple recognized and components. Next, the index generating subsystem 15 generates an index (indices) for every time frame of the video, which includes all labeled components and their appearance time that appeared in the video. Therefore, the index is used in user's text queries for videos. More specifically, the index generating subsystem 15 generates the index according to the recognition results with the recognition confidence higher than the standard value (for example, higher than 80%). In other words, the index does not comprise components with the recognition confidence lower than the standard value. However, it can perform the aforementioned multi-modal fusion to increase the recognition confidence of each component.

In the embodiment, the index comprises category, label and appearance time of each component that appeared in the video. For example, the index content can be: {id: 1,type:face,label:jay_chou,time:00:13~01:28}{id:2,type:object,label:car,time:00:10~01:00}{id:3,type:scene,label:sand_beach,time:01:00~01:35}, etc.

As mentioned above, the index is used for user to perform text queries for videos by keywords, and there is no necessity for the system 1 to represent the index in visible ways that users can understand.

In another embodiment, the system 1 further comprises a video description system 16 and a corpus 161, wherein the video description system 16 is connected to the plurality of component recognition subsystems 13, and the corpus 161 is connected to the video description system 16. A plurality of syntax rules is stored in the corpus 161.

The video description system 16 obtains multiple recognized components from the plurality of component recognition subsystems 13, and automatically generates a meaningful video description for the video according to the recognized components and the plurality of syntax rules of the corpus 161, and tags the video with meaningful video description. In the embodiment, the video description system 16 is a Natural Language Processing (NLP) system, which applies NLP algorithms to perform logic processing on the recognized components in order to generate meaningful video description for the video.

When the time length of some types of videos is too long (for example, a micro-film is about 30 minutes, a film is about 2 hours), which is difficult to describe the whole video with one single sentence or one short paragraph. Accordingly, the video description system 16 can generate a plurality of video descriptions for one video and tag the video with the plurality of video descriptions.

Specifically, in another embodiment, the video description system 16 segments the video into a plurality of video segments according to scene changes, video shot boundaries, or time periods of the video. In addition, the video description system 16 automatically and respectively generates different video descriptions for each video segment of the video according to multiple recognized components that appeared in each video segment. In other words, each video segment is tagged with a video description, and the whole video comprising the multiple video segments is tagged with multiple video descriptions. However, the aforementioned implementation is just one of the multiple embodiments according to the present invention, and the scope of the invention is not limited thereto.

According to the present invention, the video descriptions are used as a visible reference, so the users can easily understand the video and quickly pick up the desired video content. The video descriptions have to be logical, meaningful, and directly associated with the components appeared in the video (detailed in the following). In this technical solution disclosed by the present invention, the content provider only needs to upload the video to the system 1, and the system 1 automatically generates the aforementioned video description(s) for the video and tags the video with the generated video description(s). Thus, they don't need to manually watch the video, write down the video description and tag the video with the video description anymore. As a result, the labor cost is reduced.

As shown in FIG. 2, the system 1 also comprises a main database 17 connecting to the video input subsystem 11, the index generating subsystem 15 and the video description system 16. The main database 17 stores the aforementioned video, the index and the video description(s) matching with the video, but the scope is not limited thereto.

It should be noted that the aforementioned video input subsystem 11, the component capturing and categorizing subsystem 12, the plurality of component recognition subsystems 13, the index generating subsystem 15 and the video description system 16 can be implemented by physical system hardware, such as individual servers or computers, otherwise, they can also be implemented by one or multiple software executed in the single hardware, and the scope is not limited thereto.

Figure 3:
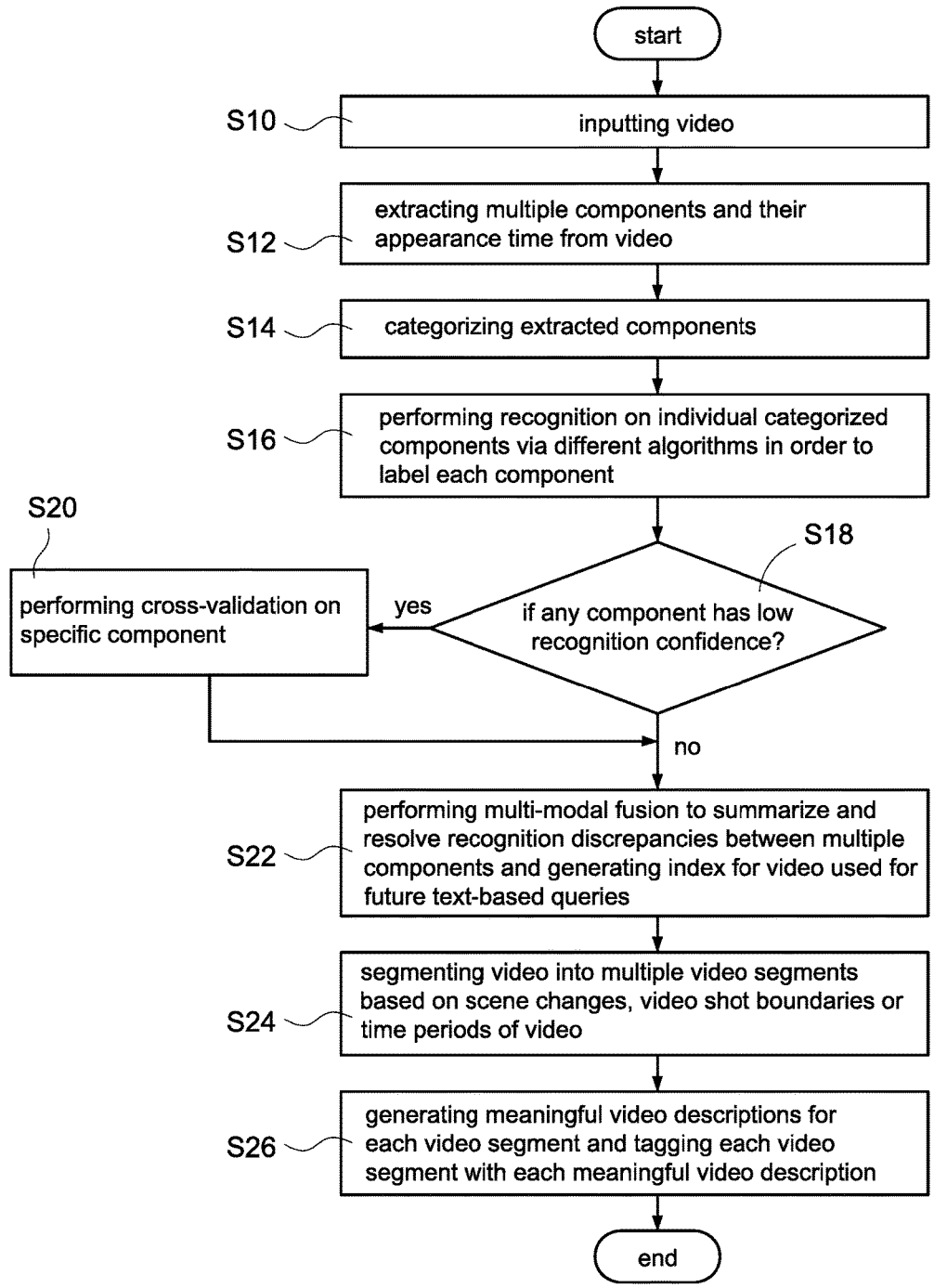
FIG. 3 is a recognition flowchart of the first embodiment according to the present invention.

FIG. 3 is a recognition flowchart of the first embodiment according to the present invention. The method according to the present invention is illustrated in FIG. 3 and the method is implemented via the system 1 shown in FIG. 2.

First, the system 1 inputs a video (step S10), and the system 1 conducts an analysis process (for example, multi-modal recognition) on the input video to extract multiple components and their appearance time from the video (step S12). In the embodiment, the system 1 conducts recognition directly after the video is inputted, otherwise, the system 1 temporarily saves the input video in the main database 17, and conducts multi-modal recognition according to a system schedule, but the scope is not limited thereto.

After step S12, the system 1 categorizes the extracted components (step S14), and performs recognition respectively on the individual categorized components via different algorithms, so as to label each component (step S16). In this case, each of the plurality of algorithms is respectively corresponding to each of the plurality of categories identifiable by the system 1.

Next, the system 1 determines if any component has low recognition confidence (step S18). If a specific component is determined of low recognition confidence, the system 1 performs cross-validation on the specific component with multiple components of high recognition confidence (step S20), so as to increase the recognition confidence and to improve the fault tolerance of the specific component.

More specifically, in step S20, the system 1 performs the cross-validation on the specific component with other components of high recognition confidence which appeared at the same time, or performs the cross-validation on the same specific component by continuing and tracking the specific component spatially and temporally when it applies in the video until a frame or frames with the specific component of high recognition confidence in the continuous time period is reached. However, the system 1 can perform the cross-validation only when any component of low recognition confidence is determined, alternatively the system 1 can also regularly perform the cross-validation. In other words, the step S18 of the method can be skipped in some embodiments.

After all the components in the video are recognized and labeled, the multi-modal fusion is performed by the system 1 to summarize and resolve any recognition discrepancies between the multiple components, and to generate the index for the video used for future text-based queries (step S22). As mentioned above, the index comprises the categories, labels, and appearance time of all components of the video. Thus, when users use the labels of the components as keywords to conduct text queries for videos, the queries can be performed directly on the individual components, and the search result includes the video matching with the components. Further, the searched video may be forward to the segment where the component appears and then played.

After the step S22, the system 1 segments the video (video sequence) into multiple video segments (sub-sequences) based on scene changes, video shot boundaries, or time periods of the video (step S24). Next, the system 1 generates meaningful video descriptions for each video segment according to multiple recognized and labeled components of each video segment, and tags each video segment with each meaningful video description (step S26). In this embodiment, the system 1 executes NPL algorithm(s) on the multiple recognized and labeled components in order to generate the meaningful video descriptions.

However, as mentioned above, the system 1 may selectively segment a video into multiple video segments and generate multiple video descriptions for each segment (i.e., executing the aforementioned step S24) according to the video type (such as commercials, micro-films, films, music videos, etc.) or time length (such as 30 seconds, 1 minute, 30 minutes, 1 hour, etc.), otherwise, the system 1 may directly generate a single video description for the whole video (i.e., the aforementioned step S24 is skipped).

It should be noted that the system 1 in this embodiment discards one or multiple components of the recognition confidence lower than the aforementioned standard value, and the component(s) in not included in the index and is not applied to generate the video description, therefore, the quality of users searching results can be rest assured. However, the recognition confidence of the components can be increased by the system 1 via performing the aforementioned multi-modal fusion.

Figure 4:
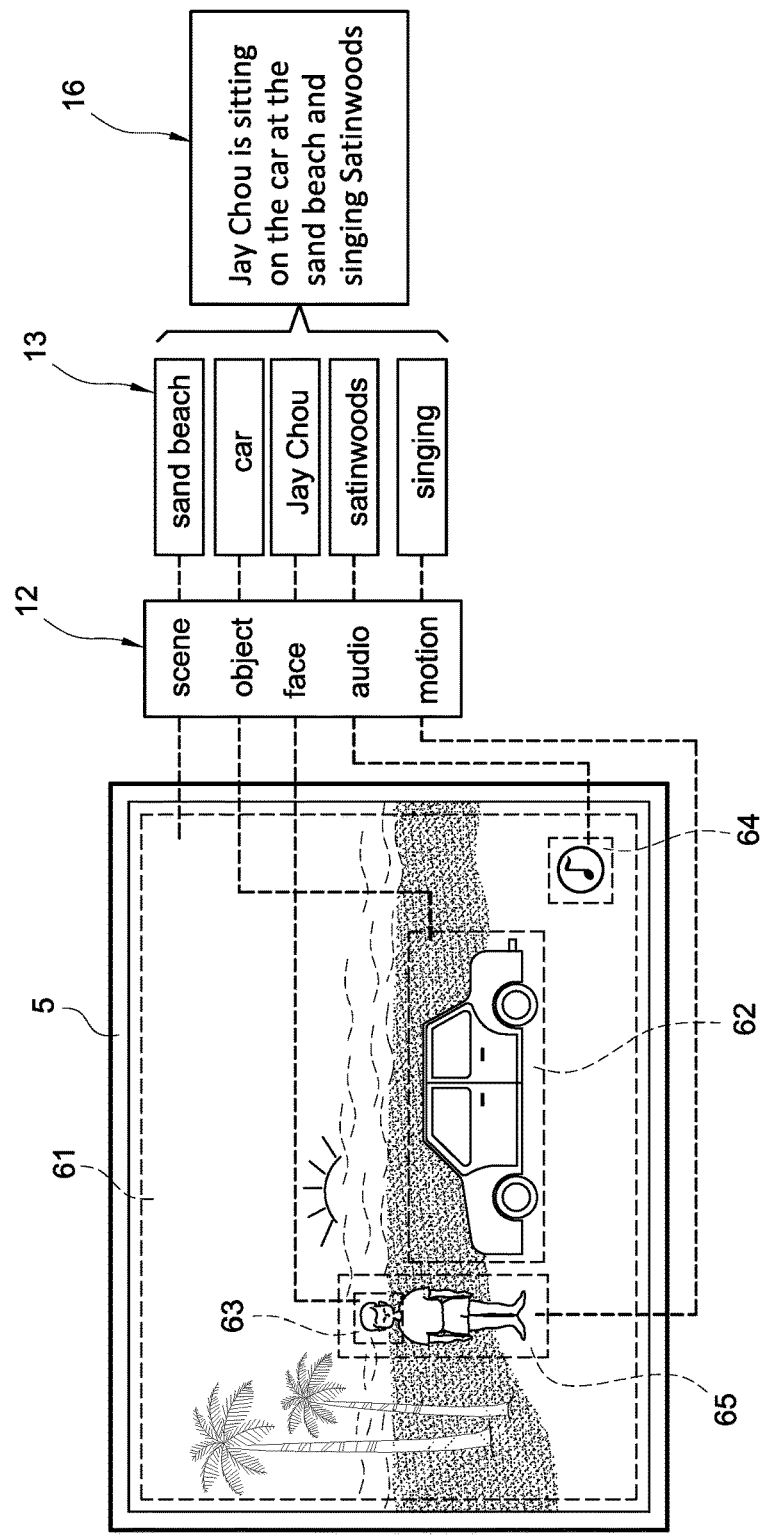
FIG. 4 is a component recognition schematic diagram of the first embodiment according to the present invention.
Figure 5:
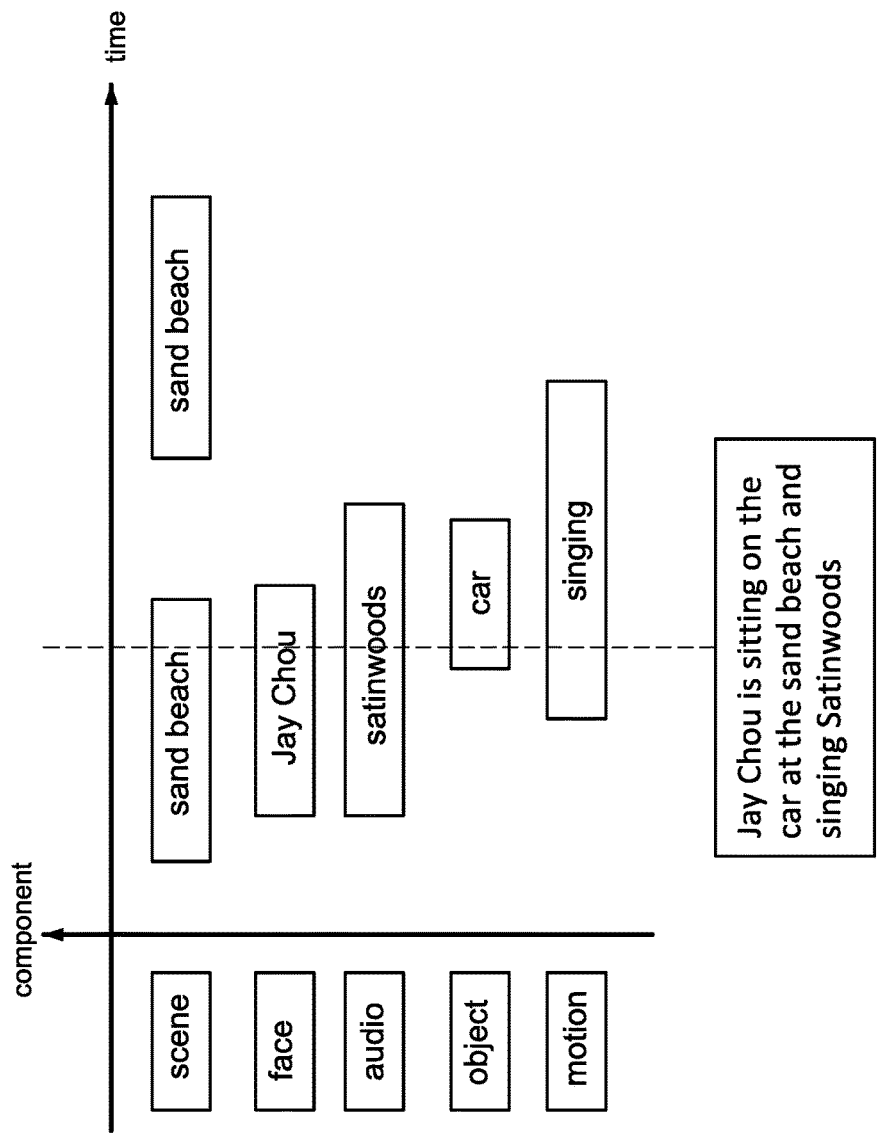
FIG. 5 is a component appearance time schematic diagram of the first embodiment according to the present invention.

Refer to FIG. 4 and FIG. 5, where FIG. 4 is a component recognition schematic diagram of the first embodiment according to the present invention, FIG. 5 is a component appearance time schematic diagram of the first embodiment according to the present invention. As shown in FIG. 4, when a video 5 is inputted to the system 1, the system 1 extracts, categorizes and recognizes the multiple components of the video 5 according to the playing time sequence.

In FIG. 4, one shot of the frames in the video 5 is used as an example. The system 1 extracts a first component 61, a second component 62, a third component 63, a fourth component 64 and a fifth component 65 from the frame, and categorizes the first component 61 to a "scene" category, categorizes the second component 62 to a "object" category, categorizes the third component 63 to a "face" category, categorizes the fourth component 64 to a "audio" category, and categorizes the fifth component 65 to a "motion" category. After the components are all categorized, the system 1 respectively recognizes the categorized components 61-65 with different algorithms according to their categories.

As shown in FIG. 4, the system 1 labels the first component as "sand beach" after the first component 61 is recognized, labels the second component as "car" after the second component 62 is recognized, labels the third component as "Jay Chou" after the third component 63 is recognized, labels the fourth component as "Satinwoods" after the fourth component 64 is recognized, and labels the fifth component as "singing" after the fifth component 65 is recognized.

As shown in FIG. 5, after all of the components are recognized and labeled, the index is then generated for the future text based queries by the index generating subsystem 15. It should be mentioned that before the index is generated, the aforementioned multi-modal fusion can be performed to summarize and resolve any recognition discrepancies between the multiple components.

Next, the meaningful video description(s) is generated and tagged with the video 5, such as "Jay Chou is sitting on the car at the sand beach and singing Satinwoods", via the video description system 16. Therefore, users can easily understand the video content by taking a glance at the video description and the main components of the video 5.

Figure 6:
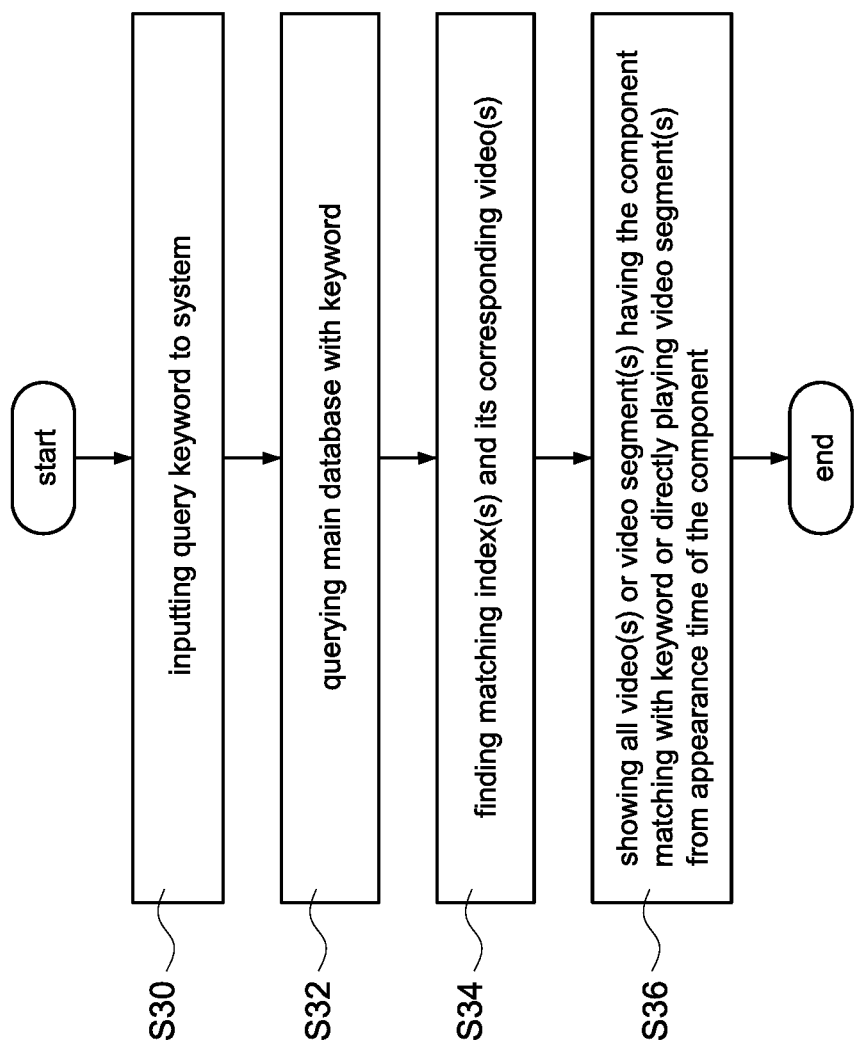
FIG. 6 is a component query flowchart of the first embodiment according to the present invention.

FIG. 6 is a component query flowchart of the first embodiment according to the present invention. When users want to query for a desired video, they need to use the desktop computers 2, the laptops 3 or the mobile devices 4 to connect to the system 1 via a network, and input query keyword to the system 1 (step S30).

Next, the main database 17 is queried with the keyword (step S32), and more specifically, multiple indices in the main database 17 are queried with the keyword. After step S32, matching index(es) and its corresponding video(s) are found by the system 1 (step S34). As a result, all video(s) or video segment(s) having the component matching with the keyword are showed on the video recognition platform, or directly played from the appearance time of the component, according to the user setup (step S36).

In the other embodiment, multiple pictures or movies are uploaded to the system 1 by users instead of the textual keyword. The system 1 recognizes and labels the components of the pictures or the movies via the aforementioned technical solution. Next, the system 1 automatically uses the labels as keywords and queries the main database 17 by the keywords. In this embodiment, the system 1 supports the users to perform picture-based queries and movie-based queries.

With the technical solutions in the present invention, videos can be searched easier and more precise via text-based queries, picture-based queries or movie-based queries. These technical solutions can not only make the queries more convenient to users, but also effectively increase the recognition confidence and improve the fault tolerance of the components in the videos. In addition, with these technical solutions, the costly process of manually writing the video descriptions and tagging the videos can be avoided.

As the skilled person will appreciate, various changes and modifications can be made to the described embodiment. It is intended to include all such variations, modifications and equivalents which fall within the scope of the present invention, as defined in the accompanying claims.

What is claimed is:

1. A method for multi-modal fusion based fault tolerant video content recognition, comprising:
   a) inputting a video;
   b) analyzing the video to extract a plurality of components from the video and their appearance time of each extracted component appeared in the video according to playing time sequence of the video;
   c) categorizing the plurality of components respectively into a plurality of categories;
   d) using a corresponding algorithm to recognize and label each categorized component, wherein each algorithm respectively matches with one of the plurality of categories;
   e) performing a cross-validation on the plurality of components to increase recognition confidence and to improve fault tolerance of each component;
   f) generating an index for text-based queries of the video according to each recognized and labeled component, wherein the index comprises the category, the label and the appearance time of each component of the video;
   g) generating a meaningful video description for the whole video according to each recognized and labeled component and tagging the whole video with the meaningful video description;
   h) after step c, determining if a specific component of low recognition confidence exists; and
   i) executing the step e when the specific component exists, wherein the step e is to perform the cross-validation on the specific component with other components appeared at the same time, or to perform the cross-validation on the same specific component by tracking the specific component spatially across different time periods within the video until a frame comprising the specific component of high confidence is reached, wherein the time periods are consecutive, discontinuous or a combination thereof.

2. The method for multi-modal fusion based fault tolerant video content recognition of claim 1, wherein the method further comprises following steps:
   j) after step f, segmenting the video into a plurality of video segments according to scene changes, video shot boundaries or time periods of the video; and
   k) generating multiple meaningful video descriptions for each video segment respectively according to each recognized and labeled component that appeared in each video segment and tagging each video segment respectively with each meaningful video description.

3. The method for multi-modal fusion based fault tolerant video content recognition of claim 2, wherein, in the step g and the step k, the meaningful video description is generated via processing each component with a Natural Language Processing (NLP) algorithm.

4. The method for multi-modal fusion based fault tolerant video content recognition of claim 2, wherein the index and the meaningful video description ignore one or multiple components of recognition confidence lower than a standard value.

5. The method for multi-modal fusion based fault tolerant video content recognition of claim 1, wherein the plurality of categories is consisted of face, image, text, audio, motion, object and scene.

6. A system for multi-modal fusion based fault tolerant video content recognition, comprising:
   a video input subsystem for receiving an inputted video;
   a component capturing and categorizing subsystem connecting to the video input subsystem for analyzing the video and extracting a plurality of components from the video and their appearance time of each extracted component appeared within the video according to playing time sequence of the video, and respectively categorizing the extracted components into a plurality of categories;

a plurality of component recognition subsystems connecting to the component capturing and categorizing subsystem, each component recognition subsystem respectively matching with one of the plurality of categories, and recognizing and labeling each component in same category via corresponding algorithm, and the plurality of component recognition subsystems conducting a cross-validation with the plurality of components to increase recognition confidence and fault tolerance of each component by performing the cross-validation on a specific component with other components appeared at the same time or performing the cross-validation on the same specific component by tracking the specific component spatially across different time periods within the video until a frame comprising the specific component of high confidence is reached when the specific component of low recognition confidence exists, wherein the time periods are consecutive, discontinuous or a combination thereof;

an index generating subsystem connecting to the plurality of component recognition subsystems, generating an index for text-based queries of the video according to each recognized and labeled component, wherein the index comprises the category, the label and the appearance time of each component of the video;

a corpus storing a plurality of syntax rules; and a video description system connecting to the plurality of component recognition subsystems and the corpus for generating a meaningful video description for the whole video according to each recognized and labeled component and the plurality of syntax rules and tagging the whole video with the meaningful video description.

7. The system for multi-modal fusion based fault tolerant video content recognition of claim 6, wherein the system further comprises a category database connecting to the component capturing and categorizing subsystem, the category database stores multiple characteristics respectively according to each of the plurality of categories, the component capturing and categorizing subsystem compares each individual component with the characteristics of the category database for determining each component's category.

8. The system for multi-modal fusion based fault tolerant video content recognition of claim 6, wherein the system further comprises a plurality of component databases respectively connecting to one of the plurality of component recognition subsystems, each component database belongs to the same category as the connected component recognition subsystem, and stores the component data of its category.

9. The system for multi-modal fusion based fault tolerant video content recognition of claim 6, wherein the video description system segments the video into multiple video segments based on scene changes, video shot boundaries or time periods of the video, and generates the meaningful video description for each video segment respectively according to each component appeared in each video segment.

10. The system for multi-modal fusion based fault tolerant video content recognition of claim 6, wherein the video description system is a Natural Language Processing (NLP) system.

11. The system for multi-modal fusion based fault tolerant video content recognition of claim 10, wherein the system further comprises a main database connecting to the video input subsystem, the index generating subsystem and the video description system for storing the video, the index and the meaningful video description.

12. The system for multi-modal fusion based fault tolerant video content recognition of claim 6, wherein the plurality of categories is consisted of face, image, text, audio, motion, object and scene.

* * * * *